Aug. 6, 1946.   F. S. KEAHEY   2,405,148
COUPLING
Filed April 3, 1943

INVENTOR.
Frank S. Keahey
BY Earl Chappell

Patented Aug. 6, 1946

2,405,148

UNITED STATES PATENT OFFICE 2,405,148

COUPLING

Frank S. Keahey, Sturgis, Mich., assignor, by direct and mesne assignments, to Kirsch Company, Sturgis, Mich.

Application April 3, 1943, Serial No. 481,725

4 Claims. (Cl. 287—100)

The main objects of this invention are:

First, to provide a coupling well adapted for use in control rods and the like of airplanes and other relations where a flexible joint is required.

Second, to provide a coupling element in which the parts may be economically produced, readily assembled, and at the same time provide a strong and compact structure which cannot be disassembled when in cooperating relation to other coacting parts.

Objects relating to details and economies of the invention will appear from the description to follow. The invention is defined and pointed out in the claims.

Preferred embodiments of the invention are illustrated in the accompanying drawing, in which.

Figure 1:
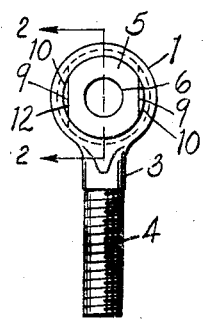
Fig. 1 is a side elevation of a coupling unit embodying my invention with the parts in assembled relation.
Figure 2:
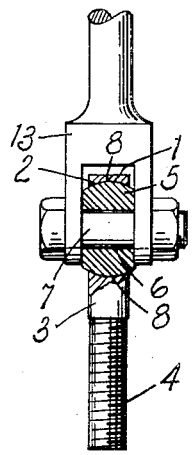
Fig. 2 is a fragmentary view of a coupling embodying my invention partially in section on line 2—2 of Fig. 1.
Figure 3:
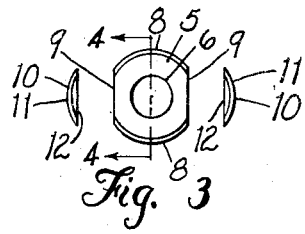
Fig. 3 is an exploded side elevational view of the ball member and its coacting complemental filler segments.
Figure 4:
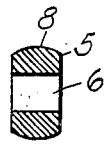
Fig. 4 is a sectional view on line 4—4 of Fig. 3.
Figure 5:
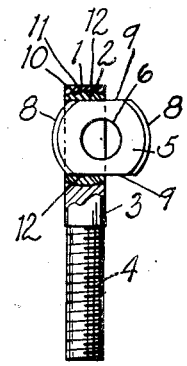
Fig. 5 is a fragmentary view partially in longitudinal section illustrating the manner of assembling and disassembling the ball element within the socket element.

The embodiment of my invention as illustrated in Figs. 1 to 5 inclusive comprises the socket member 1 having an annular internal bearing 2 of concave section. This socket member is provided with a shank 3 threaded at 4 for convenience in attachment to one of the elements to be coupled.

The ball member 5 is disk-like in general form and is provided with an axial coupling pin hole or opening 6 adapted to receive a coupling pin as 7. This ball member has opposed segmental bearing portions 8 of convex section adapted to coact with the internal bearing of the socket member. This ball member has opposed flattened sides 9 between the bearing portions 8, these flattened sides or portions 9 being parallel.

The segmental filler elements 10 have convexed bearing portions 11 complementary to the bearing portions 8 of the ball member and they have flat inner sides 12 which complement the flat sides 9 of the ball member.

In assembling, these filler elements are inserted within the socket member in opposed relation and the ball member is then presented between them at a 90° angular relation thereto with its flattened sides in opposed relation to the flattened inner sides of the filler members.

With the ball member properly centered between the members 10, it is rotated on its axis to bring its bearing surfaces into coacting relation with the bearing of the socket member and as long as that relation is maintained, the ball member is retained within the socket member.

The coupling pin 7 is carried by the forked coupling member 13 which is used in connection with the ball and socket member described. When the parts are engaged it is impossible to disassemble them without removing the coupling pin and reversing the assembling operations described.

With the parts thus arranged, they are very easily machined and they are very easily assembled. The filler elements serve to exclude dust and dirt which is an important feature thereof. They are also of advantage in simplifying manufacture.

I have illustrated and described my invention in very practical commercial embodiments thereof. I have not attempted to illustrate or describe certain modifications and adaptations which I contemplate as it is believed that this disclosure will enable those skilled in the art to embody or adapt my invention as may be desired.

Having thus described my invention, what I claim as new and desire to secure by Letters Patent, is:

1. In a coupling, the combination of a socket member provided with a shank and having an internal annular bearing of concave section, a ball member having an axial coupling pin opening and having opposed segmental bearing portions of convex section adapted to coact with the internal bearing of said socket member, said ball member having opposed parallel flattened surfaces between its said segmental bearing portions, segmental filler elements having segmental bearing portions of convex section complemental to the bearing portions of said ball member and having flattened inner sides coacting with the flattened surfaces of the said ball member, said ball member being insertable between the flattened surfaces of said segmental elements when they are positioned in opposed relation within said socket member and the ball member is presented at 90° angular relation thereto with its flattened surfaces in opposed relation to the flattened surfaces of the segmental elements, said ball member being retained in said socket member by the engagement of its bearing surfaces with the bearing of the socket member, and a second coupling member forked to embrace said socket member and provided with a coupling pin engaging said coupling pin opening of said ball member.

2. In a coupling, the combination of a socket member having an internal annular bearing of concave section, a ball member having opposed segmental bearing portions of convex section adapted to coact with the internal bearing of said socket member, said ball member having opposed parallel flattened surfaces between its said segmental bearing portions, and segmental filler elements having segmental bearing portions of convex section complemental to the bearing portions of said ball member and having flattened inner sides coacting with the flattened surfaces of the said ball member, said ball member being insertable between the flattened surfaces of said segmental elements when they are positioned in opposed relation within said socket member and the ball member is presented at 90° angular relation thereto with its flattened surfaces in opposed relation to the flattened surfaces of the segmental elements, said ball member being retained in said socket member by the engagement of its bearing surfaces with the bearing of the socket member.

3. In a coupling, the combination of a socket member provided with an internal annular bearing of concave section, a ball member having an axial coupling pin opening and having opposed segmental bearing portions of convex section adapted to coact with the internal bearing of said socket member, said ball member having opposed parallel flattened surfaces between its said segmental bearing portions, segmental filler elements complemental to the bearing portions of said ball member and coacting with the flattened surfaces of the said ball member, said ball member being insertable between the said segmental elements when they are positioned in opposed relation within said socket member and the ball member is presented in angular relation thereto with its flattened surfaces in opposed relation to the segmental elements, said ball member being retained in said socket member by the engagement of its bearing surfaces with the bearing of the socket member, and a second coupling member forked to embrace said socket member and provided with a coupling pin engaging said coupling pin opening of said ball member.

4. In a coupling, the combination of a socket member provided with an internal annular bearing of concave section, a ball member having opposed segmental bearing portions of convex section adapted to coact with the internal bearing of said socket member, said ball member having opposed parallel flattened surfaces between its said segmental bearing portions, and segmental filler elements complemental to the bearing portions of said ball member and coacting with the flattened surfaces of the said ball member, said ball member being insertable between the said segmental elements when they are positioned in opposed relation within said socket member and the ball member is presented in angular relation thereto with its flattened surfaces in opposed relation to the segmental elements.

FRANK S. KEAHEY.